US012770925B2

(12) United States Patent
Cheng et al.

(10) Patent No.: US 12,770,925 B2
(45) **Date of Patent: *Oct. 20, 2026**

(54) LITHIUM BIS(FLUOROSULFONYL)IMIDE AND PREPARATION METHOD THEREOF, ELECTROLYTIC SOLUTION AND SECONDARY BATTERY

(71) Applicants: CONTEMPORARY AMPEREX TECHNOLOGY CO., LIMITED, Ningde (CN); CATL-SICONG NOVEL MATERIALS CO., LTD, Longyan (CN)

(72) Inventors: Sicong Cheng, Longyan (CN); Qisen Huang, Ningde (CN)

(73) Assignees: CONTEMPORARY AMPEREX TECHNOLOGY CO., LIMITED, Ningde (CN); CATL-SICONG NOVEL MATERIALS CO., LTD, Longyan (CN)

( * ) Notice: Subject to any disclaimer, the term of this patent is extended or adjusted under 35 U.S.C. 154(b) by 625 days.

This patent is subject to a terminal disclaimer.

(21) Appl. No.: 18/446,441

(22) Filed: Aug. 8, 2023

(65) Prior Publication Data

US 2023/0387468 A1 Nov. 30, 2023

Related U.S. Application Data

(63) Continuation of application No. PCT/CN2022/074934, filed on Jan. 29, 2022.

(51) Int. Cl.

*H01M 10/0568* (2010.01)
*H01M 10/0525* (2010.01)

(52) U.S. Cl.

CPC ... *H01M 10/0568* (2013.01); *H01M 10/0525* (2013.01)

(58) Field of Classification Search

CPC ............ C01B 21/086; C01B 21/0935; H01M 10/0525; H01M 10/0568

See application file for complete search history.

(56) References Cited

U.S. PATENT DOCUMENTS

2012/0020867 A1 1/2012 Morinaka et al.
2015/0249269 A1 9/2015 Yoon et al.

FOREIGN PATENT DOCUMENTS

CN 102378755 A 3/2012
CN 104495767 A 4/2015
CN 104671224 A 6/2015
CN 106044728 A 10/2016
CN 107188138 A 9/2017
CN 107215853 A 9/2017

(Continued)

OTHER PUBLICATIONS

English Machine Translation: CN 110436424.*

(Continued)

*Primary Examiner* — Holly Rickman
*Assistant Examiner* — Linda N Chau
(74) *Attorney, Agent, or Firm* — ANOVA LAW GROUP, PLLC

(57) ABSTRACT

A method for preparing lithium bis(fluorosulfonyl)imide includes a synthesis step, an evaporation step, an extraction step, an alkalinization step, a dehydration step, and a desolventization step.

16 Claims, 2 Drawing Sheets

(56) References Cited

FOREIGN PATENT DOCUMENTS

| | | | |
|---|---|---|---|
| CN | 110436424 | A | 11/2019 |
| CN | 110540176 | A | 12/2019 |
| CN | 111320151 | A | 6/2020 |
| CN | 111573639 | A | 8/2020 |
| CN | 111620315 | A | 9/2020 |
| CN | 111792630 | A | 10/2020 |
| CN | 112919435 | A | 6/2021 |
| CN | 113582145 | A | 11/2021 |
| CN | 113800485 | A | 12/2021 |
| WO | 2020102907 | A1 | 5/2020 |

OTHER PUBLICATIONS

English Machine Translation: CN 111620315.*
English Machine Translation: CN 112919435.*
The World Intellectual Property Organization (WIPO) International Search Report and Written Opinion for PCT/CN2022/074934 Oct. 26, 2022 17 pages (English translation included).
The China National Intellectual Property Administration (CNIPA) The First Office Action for Chinese Application 202210111591.4 Sep. 7, 2022 14 Pages (With Translation).
The World Intellectual Property Organization (WIPO) International Search Report and Written Opinion for PCT/CN2022/074931 Oct. 25, 2022 15 Pages (including translation).
Tong-qi Zhang, "Research Progress in Synthesis and Application of Lithium Bisfluorosulfonylimide", Chemical Engineering Design Communications, vol. 46, No. 1, Jan. 2020.
Jiangfeng Qian et al. "High rate and stable cycling of lithium metal anode." Nature communications 6.1 (2015): 6362.
China National Intellectual Property Administration (CNIPA) The First Office Action for Application No. 202210111616.0 Sep. 13, 2022 20 Pages (including translation).

* cited by examiner

LITHIUM BIS(FLUOROSULFONYL)IMIDE AND PREPARATION METHOD THEREOF, ELECTROLYTIC SOLUTION AND SECONDARY BATTERY

CROSS-REFERENCE TO RELATED APPLICATION

This application is a continuation of International Application No. PCT/CN2022/074934, filed on Jan. 29, 2022, the entire content of which is incorporated herein by reference.

TECHNICAL FIELD

The present application relates to a method for preparing lithium bis(fluorosulfonyl)imide, lithium bis(fluorosulfonyl) imide prepared by the method, an electrolytic solution containing the lithium bis(fluorosulfonyl)imide, and a secondary battery thereof.

BACKGROUND

As lithium bis(fluorosulfonyl)imide (LiFSI) has a special molecular structure, it is possible to obtain higher conductivity by adding LiFSI to an electrolytic solution. Meanwhile, LiFSI also has the characteristics of high thermal stability, wide electrochemical window, and low corrosion rate, and can improve cycle performance and rate performance of power batteries especially in power batteries, and thus is an excellent choice for an electrolyte lithium salt of lithium ion batteries.

In the related art, synthesis and purification of LiFSI have many problems in industrialized large-scale production. The synthesis process is cumbersome, long in time, low in product conversion rate, and large in consumption of raw and auxiliary materials and difficult for recycling, and therefore low in economy. The present application aims to solve at least some of these problems, and proposes a new continuous method for producing LiFSI, so that LiFSI reaches battery-level standards in aspects of purity and moisture, is low in production cost and less in three wastes, and is suitable for industrial production.

SUMMARY

The present application is carried out in view of the above-mentioned problems, and its purpose is to provide a method for preparing lithium bis(fluorosulfonyl)imide in order to solve problems of low product purity, high moisture, high production cost and many three wastes in the preparation of LiFSI in the related art.

In order to achieve the above purpose, the present application provides a method for preparing lithium bis(fluorosulfonyl)imide, lithium bis(fluorosulfonyl)imide prepared by the method, an electrolytic solution containing the lithium bis(fluorosulfonyl)imide and a secondary battery thereof.

A first aspect of the present application provides a method for preparing lithium bis(fluorosulfonyl)imide, including the following steps:

(a) a synthesis step: subjecting sulfuryl fluoride, ammonia gas and triethylamine to reaction in a reaction device in the presence of a solvent to obtain a stream α1 containing $(SO_2F—NH—SO_2F)·Et_3N$, a triethylamine hydrogen fluoride salt and triethylamine;

(b) an evaporation step: performing evaporation on the stream α1 to obtain a stream α2 containing $(SO_2F—NH—SO_2F)·Et_3N$ and the triethylamine hydrogen fluoride salt, performing post-treatment on the evaporated solvent and the triethylamine optionally, and then looping back to step (a);

(c) an extraction step: washing the stream α2 obtained in step (b) with water in an extraction tower or a static mixer to obtain an oil phase α3 containing $(SO_2F—NH—SO_2F)·Et_3N$ and an aqueous phase $\alpha_{water}$ containing the triethylamine hydrogen fluoride salt, and separating out the oil phase α3;

(d) an alkalinization step: delivering the oil phase α3 obtained in step (c) to an evaporator to be mixed with a lithium hydroxide aqueous solution to obtain a mixture stream β1-1, and then performing reduced-pressure evaporation on the stream β1-1 to obtain a stream β1-2 containing lithium bis(fluorosulfonyl)imide;

(e) a dehydration step: mixing the stream β1-2 containing the lithium bis(fluorosulfonyl)imide with an ester solvent, and then performing evaporation in an evaporator to obtain a stream β2 containing lithium bis(fluorosulfonyl)imide;

(f) a desolventization step: mixing the stream β2 obtained in step (e) with an ester solvent, and then performing evaporation in an evaporator to obtain lithium bis (fluorosulfonyl)imide β3; and optionally (g) a refinement step: delivering the lithium bis(fluorosulfonyl)imide β3 obtained in step (f) to a dissolution and acid removal kettle and adding an ester solvent and lithium hydroxide, then performing centrifugation and filtration, delivering a filtrate g-1 obtained to a dehydration kettle containing a molecular sieve to remove water, removing the molecular sieve by filtration, and delivering a filtrate g-2 obtained to a product preparation kettle, and optionally performing demagnetization and filtration treatment.

By applying the preparation method of the present application, LiFSI with high purity and low moisture can be obtained. Meanwhile, product cost is low and three wastes are less.

In any embodiment, in step (a), a molar ratio of the sulfuryl fluoride:the ammonia gas: the triethylamine is (1.5-3.5):1:(1-6), optionally (2-3):1:(1-5).

In any embodiment, in step (a), the solvent is selected from acetonitrile, propionitrile, isopropionitrile, diethyl ether, propyl ether, isopropyl ether, tetrahydrofuran, acetone, butanone, methyl isobutyl ketone, methyl pyrrolidone or a mixture of any two or more thereof, in some embodiments, the solvent contains at least acetonitrile.

In any embodiment, in step (a), reaction temperature of the reaction is not higher than 25° C., optionally 3° C.-20° C.; and/or, reaction pressure of the reaction is not higher than 0.4 MPa, optionally not higher than 0.25 MPa.

In any embodiment, between step (a) and step (b), the method further includes a step of filtering the stream α1 to remove a by-product sulfonamide $(NH_2—SO_2—NH_2)$ solid. Optionally, the step of filtering includes performing filtration by using a tetrafluoro filter bag with a pore diameter of 5 μm to 20 μm.

In any embodiment, in step (b), the stream α1 is evaporated by using a falling film evaporator.

In any embodiment, in step (c), the aqueous phase $\alpha_{water}$ containing the triethylamine hydrogen fluoride salt is delivered for recycling treatment, and triethylamine obtained after the aqueous phase $\alpha_{water}$ is subjected to alkalinization and purification treatment is recyclable.

In any embodiment, in step (d), the oil phase α3 is mixed and stirred with the lithium hydroxide aqueous solution for reaction for 0.5-3 hours, optionally 1-2 hours.

In any embodiment, in step (d), a condensate obtained by evaporating the stream β1-1 is subjected to standing liquid separation, an upper layer liquid is a triethylamine aqueous solution, and the upper layer liquid is delivered for recycling treatment; and a lower layer liquid is condensed water, and the lower layer liquid is recycled to prepare the lithium hydroxide aqueous solution required for the alkalinization step.

In any embodiment, in step (d), a volume ratio of the stream α3 to the lithium hydroxide aqueous solution is (0.8-5):1, optionally (1-1.2):1.

In any embodiment, in step (e) and step (f), an aqueous solution of the ester solvent obtained by condensation is delivered for recycling treatment.

In any embodiment, in step (e), the obtained stream β2 contains 0.1 vol % to 2 vol % of the water and the 20 vol % to 40 vol % of the ester solvent.

In any embodiment, the lithium bis(fluorosulfonyl)imide β3 obtained in step (f) has a water content of 2000 ppm to 4000 ppm, in some embodiments a water content of 2300 ppm to 2700 ppm.

In any embodiment, the evaporation in step (b), step (d), step (e) and step (f) is able to be performed in one or more evaporators.

In any embodiment, in step (f) and step (g), the centrifugation is performed by using a scraper centrifuge or a disc centrifuge.

In any embodiment, in step (e), step (f) and step (g), the ester solvent is respectively independently selected from an organic solvent that has a boiling point greater than 70° C., in some embodiments greater than 80° C., and in some embodiments 100-130° C. and is insoluble in water. Optionally, the ester solvent contains a carbonate solvent, further optionally, the carbonate solvent is selected from ethylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate or a mixture of two or more thereof. And/or, the ester solvent contains a carboxylate solvent, further optionally, the carboxylate solvent is selected from propyl acetate, methyl propionate, ethyl propionate, propyl propionate, methyl butyrate, ethyl butyrate or a mixture of two or more thereof. Optionally, the ester solvent is at least one selected from ethyl methyl carbonate, dimethyl carbonate and diethyl carbonate.

In any embodiment, temperature of the evaporation in the alkalinization step (d) is controlled to be 30° C.-40° C., optionally 30° C.-35° C.; and/or, temperature of the evaporation in the dehydration step (e) is controlled to be 40° C.-55° C., optionally 45° C.-50° C.; and/or, temperature of the evaporation in the desolventization step (f) is controlled to be 60° C.-80° C., optionally 65° C.-75° C.

In any embodiment, in step (d), step (e) and step (f), a pH of the mixture is maintained at 7-9, in some embodiments 8-9 by adding the lithium hydroxide aqueous solution during the evaporation.

In any embodiment, in step (d), step (e) and step (f), a concentration of the lithium hydroxide aqueous solution is 1 mol/L to 15 mol/L, optionally 2 mol/L to 10 mol/L.

In any embodiment, in step (f), for the lithium bis(fluorosulfonyl)imide β3, HF is ≤50 g/g and a water content is ≤20 μg/g.

In any embodiment, in step (e), step (f) and step (g), the ester solvents used are the same.

A second aspect of the present application further provides lithium bis(fluorosulfonyl)imide prepared by the method according to the first aspect of the present application.

A third aspect of the present application further provides an electrolytic solution including the lithium bis(fluorosulfonyl)imide prepared by the method according to the first aspect of the present application.

A fourth aspect of the present application further provides a secondary battery including the electrolytic solution according to the third aspect of the present application.

The electrolytic solution or the secondary battery of the present application includes the lithium bis(fluorosulfonyl)imide prepared according to the first aspect of the present application, and therefore has at least the same advantages as the method described in the first aspect of the present application.

DESCRIPTION OF EMBODIMENTS

Figure 1:
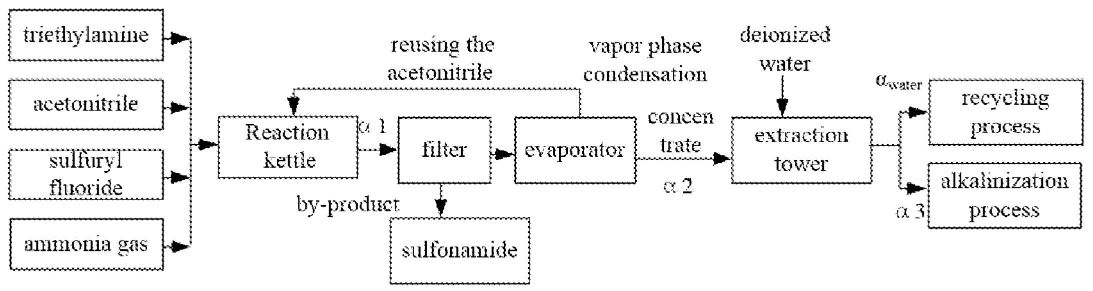
FIG. 1 shows a schematic flow chart of an α-stage process (synthesis→evaporation→extraction), in which an extraction tower is used in an extraction process.

Hereinafter, embodiments specifically disclosing a method for preparing lithium bis(fluorosulfonyl)imide of the present application will be described in detail with reference to drawings as appropriate. However, unnecessarily detailed descriptions may be omitted in some cases. For example, detailed description for a well-known matter and repeated description for a practically identical structure are omitted. This is done to avoid unnecessarily redundant descriptions for ease of understanding by persons skilled in the art. In addition, the drawings and the following description are provided for persons skilled in the art to fully appreciate the present application, and are not intended to limit the subject matters described in the claims.

A "range" disclosed herein is defined in the form of a lower limit and an upper limit. A given range is defined by selecting a lower limit and an upper limit, and the selected lower limit and upper limit define boundaries of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also anticipated. In addition, if the minimum range values listed are 1 and 2, and the maximum range values listed are 3, 4 and 5, all the following ranges can be anticipated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but in some embodiments, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, words "comprising" and "containing" mentioned in the present application are open-ended. For example, the words "comprising" and "containing" may mean that other components that are not listed may or may not further be comprised or contained.

The terms "more than" and "less than" used in the present application include the number at the endpoint, for example, "more than one" refers to one or more, and "more than one of A and B" refers to "A", "B" or "A and B".

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

Unless otherwise specified, content and percentage in the context of the present application are both based on mass.

Process route of the present application is: synthesis→evaporation→extraction→alkalinization→dehydration→desolventization→refinement (the refinement step is an optional process). Each step will be further described below.

[Synthesis Step]

In the synthesis step (a) of the present application, sulfuryl fluoride, ammonia gas and triethylamine are subjected to reaction in a reaction device in the presence of a solvent to obtain a stream α1 containing $(SO_2F—NH—SO_2F)·Et_3N$, a triethylamine hydrogen fluoride salt and triethylamine.

In some embodiments, in step (a), the reaction between the sulfuryl fluoride, the ammonia gas and the triethylamine mainly involves the following main reaction:

$$6SO_2F_2+3NH_3+5Et_3N \rightarrow 3(SO_2F—NH—SO_2F)\cdot Et_3N+2Et_3N\cdot(HF)n$$

where n=an integer between 1-12.

At the same time, it is also accompanied by the following side reaction:

$$6NH_3+3SO_2F_2+5Et_3N \rightarrow 3NH_2—SO_2—NH_2+2Et_3N\cdot(HF)n$$

where n=an integer between 1-12.

In some embodiments, in step (a), a molar ratio of the sulfuryl fluoride:the ammonia gas: the triethylamine is (1.5-3.5):1:(1-6), optionally (2-3):1:(1-5). In the present application, when the ammonia gas is excessive, a side reaction is likely to occur, which makes the reaction mixture turbid, and results in difficulty in subsequent filtration. Meanwhile, in order to make the color of materials lighter, it is necessary to avoid a long time contact between the sulfuryl fluoride and the triethylamine. Therefore, in some embodiments, in step (a), acetonitrile and triethylamine are first added to the reaction device, and then a part of ammonia gas is introduced, in some embodiments 2%-15% of the total amount of ammonia gas, in some embodiments 3%-10%, and finally ammonia gas and sulfuryl fluoride are introduced simultaneously for reaction.

In some embodiments, in step (a), the solvent is selected from acetonitrile, propionitrile, isopropionitrile, diethyl ether, propyl ether, isopropyl ether, tetrahydrofuran, acetone, butanone, methyl isobutyl ketone, methyl pyrrolidone or a mixture of any two or more thereof, in some embodiments, the solvent contains at least acetonitrile.

In the present application, in step (a), the reaction device may be a conventional reaction device used in the art, such as a reaction kettle. In general, the reaction in (a) can be carried out in any suitable manner. For example, the reaction can be carried out in a batch reactor or in at least one semi-continuously operated reactor or at least one continuously operated reactor.

In some embodiments, in step (a), reaction temperature of the reaction is not higher than 25° C., optionally 3° C.-20° C.; and/or, reaction pressure of the reaction is not higher than 0.4 MPa, optionally not higher than 0.25 MPa. Excessive temperature and pressure will lead to more side reactions. In addition, if the temperature is too high, the solvent will easily vaporize, which results in excessive pressure in the reaction kettle and affects safe production.

The inventors of the present application have found that when a molar ratio of the sulfuryl fluoride to the ammonia gas in step (a) is (1.5-4):1, in some embodiments (2-3):1, particularly good yield and chroma are obtained.

In some embodiments, in step (a), at the end of the reaction, the stream α1 containing 30 wt % to 50 wt % of $(SO_2F—NH—SO_2F)·Et_3N$, 15 wt % to 30 wt % of the triethylamine hydrogen fluoride salt $(ET_3N·(HF)n)$ and 0 wt % to 10 wt % of the triethylamine is obtained.

In some embodiments, the stream α1 may be filtered more than once, in some embodiments 2-5 times, optionally 2 times, and a pore diameter of a filter bag used for downstream filtration is smaller than that of an upstream filter bag.

[Evaporation Step]

In the evaporation step (b) of the present application, the stream α1 is evaporated to obtain a stream α2 containing $(SO_2F—NH—SO_2F)·Et_3N$ and the triethylamine hydrogen fluoride salt, post-treatment is performed on the evaporated solvent and the triethylamine optionally, and then the method loops back to step (a).

In some embodiments, a step of filtering the stream α1 is further included between step (a) and step (b) to remove a by-product sulfonamide $(NH_2—SO_2—NH_2)$ solid, optionally, the step of filtering includes performing filtration by using a tetrafluoro filter bag with a pore diameter of 5 μm to 20 μm, optionally 6 μm to 15 μm.

In some embodiments, in step (b), the stream α1 is evaporated by using a falling film evaporator. A heat exchange medium used in the falling film evaporator may be hot water, and temperature of a hot water bucket is 50° C. to 100° C., in some embodiments 60° C. to 80° C.

In some embodiments, in step (b), the evaporation may be performed by using one or two or more evaporators connected in series, in some embodiments a falling film evaporator.

In some embodiments, in step (b), the gas stream evaporated by the evaporator is condensed by using a condenser, in some embodiments a condenser including a pre-condenser and a post-condenser, the pre-condenser is condensed with water at 0° C., and the post-condenser is condensed with water at −15° C. Optionally, internal pressure of the evaporator is −0.01 MPa to −0.1 MPa. Herein, those skilled in the art can understand that the water used in the condenser contains 30-50 wt % of antifreeze, and the antifreeze may be ethylene glycol or glycerin.

In some embodiments, the evaporation in step (b) is able to be performed in one or more evaporators.

In some embodiments, in step (b), the stream α2 includes 60 wt % to 80 wt % of $(SO_2F—NH—SO_2F)\cdot Et_3N$ and 20 wt % to 40 wt % of the triethylamine hydrogen fluoride salt.

[Extraction Step]

In the extraction step (c) of the present application, the stream α2 obtained in step (b) is washed with water in an extraction tower or a static mixer to obtain an oil phase α3 containing $(SO_2F—NH—SO_2F)\cdot Et_3N$ and an aqueous phase $\alpha_{water}$ containing the triethylamine hydrogen fluoride salt, and the oil phase α3 is separated out.

In some embodiments, in step (c), a mass ratio of the water and the stream α2 that enter the extraction tower or the static mixer is 1:(1-2), optionally 1:(1.1-1.5).

In some embodiments, in step (c), the oil phase α3 further includes 5 wt % to 15 wt % of water.

In some embodiments, in step (c), the $\alpha_{water}$ includes 75 wt % to 80 wt % of water and 20 wt % to 25 wt % of the triethylamine hydrogen fluoride salt.

In some embodiments, in step (c), the aqueous phase $\alpha_{water}$ containing the triethylamine hydrogen fluoride salt is delivered for recycling treatment, and triethylamine obtained after the aqueous phase $\alpha_{water}$ is subjected to alkalinization and purification treatment is recyclable. In addition to the triethylamine hydrogen fluoride salt, the aqueous phase also contains an impurity ion (such as $F^-$, $SO_4^{2-}$, $FSO_3^-$ or $Cl^-$). After the alkalinization and purification treatment in a recycling section, the triethylamine is recyclable, and additional economic benefits can be generated by KF sales.

In the present application, the extraction tower may be an extraction tower conventionally used in the art, such as a packed extraction tower, a sieve tray extraction tower, a rotating disc extraction tower, a vibrating sieve tray tower, a multistage centrifugal extraction tower, in some embodiments a rotating disc extraction tower.

In some embodiments, the extraction step is carried out in an extraction tower (stirring frequency is 15±1 HZ; a weight ratio of deionized water used to α2 therein is 1:(1-1.6), in some embodiments 1:(1-1.4)). A light phase (low density) enters from the bottom of the side of the extraction tower and is discharged from the top of the extraction tower; and a heavy phase enters from the top of the side of the extraction tower and is discharged from the bottom of the extraction tower, and the middle is stirred in a spiral shape (stirring effect is better, and washing and separation conditions are more superior). Unexpectedly, the inventors find that using the extraction tower for extraction can achieve better separation of an impurity ion (such as $F^-$). After treatment by the static mixer, an F ion content in α3 is ≥1000 ppm, and more LiOH needs to be consumed in the following alkalinization process; however, after treatment by the extraction tower, the F ion content in α3 is ≤100 ppm.

In the present application, measuring an F ion content and a water content in a stream is a method well known in the art, for example, measuring an F ion content by alizarin complex colorimetry, and measuring a water content by a Karl Fischer method.

In some embodiments, in step (c), the stream α2 obtained in step (b) is washed with water in the extraction tower.

In the present application, the static mixer may be a static mixer conventionally used in the art, such as a pipeline static mixer. In the case of using a static mixer, the resulting mixture needs to be pumped into a layering tank for standing layering, which usually lasts for 1-10 hours, in some embodiments 2-6 hours.

In the present application, unless otherwise specified, the water used in the text is always deionized water, which can reduce the type and content of impurity contained in a final product to the largest extent.

[Alkalinization Step]

In the alkalinization step (d) of the present application, the oil phase α3 obtained in step (c) is delivered to an evaporator to be mixed with a lithium hydroxide aqueous solution to obtain a mixture stream β1-1, and then the stream β1-1 is evaporated under reduced pressure to obtain a stream β1-2 containing lithium bis(fluorosulfonyl)imide.

In some embodiments, the alkalinization of step (d) is carried out according to the following reaction formula:

$$(SO_2F—NH—SO_2F)\cdot Et_3N+LiOH\rightarrow(SO_2F—N—SO_2F)^-Li^+(LiFSI)+Et_3N+H_2O.$$

The principle of the above reaction is that a strong base replaces a weak base, and the alkalinity of LiOH is higher than that of triethylamine in $(SO_2F—NH—SO_2F)\cdot Et_3N$, so that the triethylamine is replaced, and at the same time LiOH reacts with $(SO_2F—NH—SO_2F)\cdot Et_3N$ to generate lithium bis(fluorosulfonyl)imide, which is abbreviated as LiFSI, and the triethylamine is removed by evaporation.

In some embodiments, in step (d), the oil phase α3 is mixed and stirred with the lithium hydroxide aqueous solution for reaction for 0.5-3 hours, optionally 1-2 hours.

In some embodiments, in step (d), a concentration of the lithium hydroxide aqueous solution is 1 mol/L to 15 mol/L, optionally 2 mol/L to 10 mol/L.

In some embodiments, in step (d), a condensate obtained by evaporating the stream β1-1 is subjected to standing liquid separation, an upper layer liquid is a triethylamine aqueous solution, and the upper layer liquid is delivered for recycling treatment; and a lower layer liquid is condensed water, and the lower layer liquid is recycled to prepare the lithium hydroxide aqueous solution required for the alkalinization step.

In some embodiments, in step (d), a volume ratio of the oil phase α3 to the lithium hydroxide aqueous solution is (0.8-5):1, optionally (1-1.2):1.

In some embodiments, in step (d), when reduced-pressure evaporation is performed on the stream β1-1, a pH of the mixture is maintained at 7-9, in some embodiments 8-9, by adding the lithium hydroxide aqueous solution during the evaporation.

In some embodiments, in step (d), the evaporation is performed by using a falling film evaporator, and temperature of the evaporation is controlled to be 30° C.-40° C., optionally 30° C.-35° C.

In some embodiments, the evaporation in step (d) is able to be performed in one or more evaporators.

In some embodiments, in step (d), the stream β1-2 includes 70 wt % to 90 wt % of lithium bis(fluorosulfonyl) imide and 5 wt % to 25 wt % of water, and the balance is LiF, $Li_2SO_4$ and lithium sulfamate, etc., based on 100 wt % of stream β1-2.

[Dehydration Step]

In the dehydration step (e) of the present application, the stream β1-2 containing the lithium bis(fluorosulfonyl)imide is mixed with an ester solvent, and then evaporated in an evaporator to obtain a stream β2 containing lithium bis (fluorosulfonyl)imide.

In some embodiments, in step (e), an aqueous solution of the ester solvent obtained by condensation is delivered for recycling treatment.

In some embodiments, in step (e), the stream β1-2 is mixed with the ester solvent at a volume ratio of 1:(0.4-0.8), in some embodiments 1:(0.5-0.7).

In some embodiments, in step (e), the obtained stream β2 further contains 0.1 vol % to 2 vol % of the water and 20 vol % to 40 vol % of the ester solvent.

In some embodiments, in step (e), the evaporator is a falling film evaporator, and temperature of the evaporation is controlled to be 40° C.-55° C., optionally 45° C.-50° C.

In some embodiments, the evaporation in step (e) is able to be performed in one or more evaporators.

Since lithium salts have strong hygroscopicity, it is difficult to reduce the moisture to the required level by evaporation alone. For example, adsorption of lithium salts to water can be weakened by adding a large amount of ester organic solvents (such as carbonates and carboxylates, in some embodiments DEC and EMC) that are insoluble in water and have a boiling point in some embodiments greater than water (such as 105-130° C.), so evaporation and dehydration while adding the ester organic solvents can reduce the moisture to the required content, for example, less than 3000 ppm. A mixture of ester organic solvents and water obtained by condensation is recyclable after purification treatment in the recycling section.

In some embodiments, the following side reaction also exists in the process of adding lithium hydroxide during step (d), step (e) and step (f):

$$(SO_2F{-}N{-}SO_2F)^-Li^+ + 4LiOH \rightarrow NH_2SO_3Li + Li_2SO_4 + 2LiF + H_2O$$

Therefore, after the dehydration step (e) and before a desolventization step (f), a by-product lithium compound (such as $NH_2SO_3Li$, $Li_2SO_4$ and LiF) is optionally removed by centrifugation and filtration, such as by a scraper centrifuge or a disc centrifuge.

In some embodiments, an ester solvent is mixed with the stream β1-2, and a pH of the mixture is maintained at 7-9 while evaporation and dehydration are performed, and optionally centrifugation and filtration are performed to obtain a stream β2 containing 60 wt % to 80 wt % of lithium bis(fluorosulfonyl)imide, 20 wt % to 40 wt % of the ester solvent and 0.2 wt % to 1.5 wt % of water.

In some embodiments, in step (e), a pH of the mixture is maintained at 7-9, in some embodiments 8-9 by adding the lithium hydroxide aqueous solution during the evaporation.

In some embodiments, in step (e), a concentration of the lithium hydroxide aqueous solution is 1 mol/L to 15 mol/L, optionally 2 mol/L to 10 mol/L.

[Desolventization Step]

In the desolventization step (f) of the present application, the stream β2 obtained in step (e) is mixed with an ester solvent, and then evaporated in an evaporator to obtain lithium bis(fluorosulfonyl)imide β3.

In some embodiments, after the dehydration step (e) and before the desolventization step (f), a by-product lithium compound (such as $NH_2SO_3Li$, $Li_2SO_4$ and 2LiF) is optionally removed by centrifugation and filtration, such as by a scraper centrifuge or a disc centrifuge, so as to obtain a stream β2-1.

In some embodiments, in step (f), the stream β2 or the stream β2-1 is mixed with an ester solvent at a volume ratio of 1:(0.1-0.4), in some embodiments 1:(0.2-0.3).

In some embodiments, in step (f), the evaporator is a scraper evaporator, and temperature of the evaporation is controlled to be 60-80° C., optionally 65-75° C.

In some embodiments, the evaporation in step (f) is able to be performed in one or more evaporators.

In some embodiments, the lithium bis(fluorosulfonyl) imide β3 obtained in step (f) has a water content of 2000 ppm to 4000 ppm, in some embodiments a water content of 2300 ppm to 2700 ppm. By continuing to mix the stream β2 or the stream β2-1 obtained by filtration with the ester solvent in step (e), and then continuing to perform evaporation, the water in the stream β2 or the stream β2-1 can be further removed.

In some embodiments, in step (f), the lithium bis(fluorosulfonyl)imide β3 contains 80 wt % to 90 wt % of the lithium bis(fluorosulfonyl)imide and 10 wt % to 20 wt % of the ester solvent.

In some embodiments, in step (f), an aqueous solution of the ester solvent obtained by condensation is delivered for recycling treatment.

In some embodiments, in step (f), for the lithium bis (fluorosulfonyl)imide β3, HF is ≤50 μg/g and a water content is ≤20 μg/g. When the lithium bis(fluorosulfonyl) imide β3 does not meet the above-mentioned content, refinement treatment can be performed, that is, a refinement step (g) is performed.

In the present application, during the alkalinization, dehydration and desolventization steps, a pH of the mixture is maintained at 7-9, in some embodiments 8-9 by adding the lithium hydroxide aqueous solution during the evaporation. In some embodiments, by adding a solvent lithium hydroxide, a weak alkaline system is kept, and decomposition of a product is suppressed.

In some embodiments, a pH of the evaporated mixture is maintained in the range of 7-9, in some embodiments 8-9 by adding the lithium hydroxide aqueous solution.

In some embodiments, in step (f), a concentration of the lithium hydroxide aqueous solution is 1 mol/L to 15 mol/L, optionally 2 mol/L to 10 mol/L.

In some embodiments, in the method of the present application, treatment for crystallization of the lithium bis (fluorosulfonyl)imide β3 is not included.

[Refinement Step]

In the refinement step (g) of the present application, the lithium bis(fluorosulfonyl)imide β3 obtained in step (f) is delivered to a dissolution and acid removal kettle, and an ester solvent and lithium hydroxide are added, then centrifugation and filtration are performed, a filtrate g-1 obtained is delivered to a dehydration kettle containing a molecular sieve to remove water, the molecular sieve is removed by filtration, and a filtrate g-2 obtained is delivered to a product preparation kettle, and optionally demagnetization and filtration treatment is performed.

In the present application, according to the specific composition of the lithium bis(fluorosulfonyl)imide β3, a refinement operation can be optionally performed to meet final product requirements. For example, when for the lithium bis(fluorosulfonyl)imide β3, HF is >50 g/g and/or a water content is >20 μg/g, acid removal and water removal operations may be required. First, lithium hydroxide is added according to the measured HF content, for example, according to the measured HF content, lithium hydroxide is added in a molar ratio of 1:(1.05-1.10) for the HF to the lithium hydroxide. Then, centrifugation is carried out to filter out an impurity (LiF and LiF produced by the reaction of HF and LiOH) and a molecular sieve is added to remove water. The molecular sieve is a 4 A molecular sieve, and a weight of adsorbed water of the 4 A molecular sieve is 15-20% of a weight of the 4 A molecular sieve itself.

In some embodiments, in step (g), the lithium hydroxide is in solid form.

In some embodiments, in step (g), HF of the filtrate g-1 is ≤50 μg/g.

In some embodiments, in step (g), for the filtrate g-2, HF is ≤50 μg/g and a water content is ≤20 μg/g.

In some embodiments, in step (g), the demagnetization operation is performed by using a demagnetization filter (such as a vertical filter, a horizontal filter, a high-efficiency permanent magnetic filter, a rotary drum filter or an electromagnetic filter) for example, and a magnetic field strength of the demagnetization filter may be 5,000-12,000 gauss, in some embodiments 6,000-9,000 gauss.

In some embodiments, in step (f) and step (g), the centrifugation is performed by using a scraper centrifuge or a disc centrifuge.

In some embodiments, in step (e), step (f) and step (g), the ester solvent is respectively independently selected from an organic solvent that has a boiling point greater than 70° C., in some embodiments greater than 80° C., and in some embodiments 100-130° C. and is insoluble in water. Optionally, the ester solvent contains a carbonate solvent, further optionally, the carbonate solvent is selected from ethylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate or a mixture of two or more thereof. And/or, the ester solvent contains a carboxylate solvent, further optionally, the carboxylate solvent is selected from propyl acetate, methyl propionate, ethyl propionate, propyl propionate, methyl butyrate, ethyl butyrate or a mixture of two or more thereof. Optionally, the ester solvent is at least one selected from ethyl methyl carbonate, dimethyl carbonate and diethyl carbonate.

In some embodiments, in step (e), step (f) and step (g), the ester solvents used are the same.

A second aspect of the present application further provides lithium bis(fluorosulfonyl)imide prepared by the method according to the first aspect of the present application.

A third aspect of the present application further provides an electrolytic solution including the lithium bis(fluorosulfonyl)imide prepared by the method according to the first aspect of the present application.

A fourth aspect of the present application further provides a secondary battery including the electrolytic solution according to the third aspect of the present application.

The electrolytic solution or the secondary battery of the present application includes the lithium bis(fluorosulfonyl) imide prepared according to the first aspect of the present application, and therefore has at least the same advantages as the method described in the first aspect of the present application.

Raw and auxiliary materials used in a LiFSI synthesis process route of the present application are all relatively common chemical products. Production cost is low, there is no high temperature and high pressure in a reaction process, and exothermic heat of a front-end synthesis reaction is cooled by a refrigerator to ensure the reaction at low temperature and high safe coefficient of the reaction. As a result, LiFSI is low in the production cost, less in three wastes, high in purity, and the raw materials can be fully recycled for use, and a by-product can also be purified to generate additional economic benefits, which is suitable for industrial production. By recovering and recycling the raw materials, consumption of the raw and auxiliary materials is reduced, a utilization rate of the raw materials of reaction is improved, discharge and treatment costs of compounds are reduced, production costs are effectively reduced, and economic benefits are improved.

EXAMPLES

Examples of the present application will be described hereinafter. The examples described below are exemplary and merely used to explain the present application, and may not be understood as limitation to the present application. Where specific techniques or conditions are not specified in the examples, they are performed according to techniques or conditions described in the literature in the art or according to product specifications. Reagents or instruments used without specifying the manufacturer are all commercially available conventional products.

Example 1

[Synthesis Step→Evaporation Step→Extraction Step]

An α-stage process (synthesis→evaporation→extraction) is described with reference to FIG. 1, in which an extraction tower is used in an extraction process.

40 $m^3$ of triethylamine and 35 $m^3$ of acetonitrile were pumped into a synthesis kettle with a volume of 100 $m^3$, temperature of the kettle was reduced to 15° C., then 120 kg of ammonia gas was first introduced, and finally ammonia gas (2000 kg) and sulfuryl fluoride (26000 kg) were introduced simultaneously, while pressure in the kettle was maintained at 0.3 MPa, and temperature in the kettle was maintained at 15° C. After reaction lasted for 4 h, pressure in the kettle was reduced to 0.1 MPa, and stirring was stopped. A reaction mixture stream α1 obtained (containing 40 wt % of $(SO_2F—NH—SO_2F)\cdot Et_3N$, 18 wt % of triethylamine hydrogen fluoride salt and 6 wt % of triethylamine) was filtered through a tetrafluoro filter bag with a pore diameter of 5 m to filter out a solid by-product sulfonamide. A filtrate was pumped into a falling film evaporator (a temperature of a hot water bucket was 75° C.), and a solvent in the filtrate was evaporated under a vacuum degree of −0.02 MPa (a front stage of a vacuum pump was condensed with water at 0° C., and a latter stage was condensed with water at −15° C.) to obtain a stream α2 containing $(SO_2F—NH—SO_2F)\cdot Et_3N$ and the triethylamine hydrogen fluoride salt (containing 70 wt % of $(SO_2F—NH—SO_2F)\cdot Et_3N$ and 28 wt % of the triethylamine hydrogen fluoride salt) and a condensate containing acetonitrile. The condensate was recycled for synthesis in the synthesis kettle in the first step. The stream α2 was pumped to a rotary disc extraction tower (a stirring frequency is 15±1 Hz; and a flow rate was controlled so that a weight ratio of deionized water to α2 is 1:1.2), and was fully mixed with deionized water in the extraction tower to obtain an aqueous phase $\alpha_{water}$ containing the triethylamine hydrogen fluoride salt as an upper layer liquid (containing 77 wt % of the water and 22 wt % of the triethylamine hydrogen fluoride salt), and an oil phase α3 containing $(SO_2F—NH—SO_2F)\cdot Et_3N$ as a lower layer liquid (also containing 15 wt % of the water). The upper aqueous phase was delivered to a recycling workshop for treatment, and the lower oil phase was delivered to an alkalinization step. Upon detection, the oil phase α3 also contained 100 ppm of P.

Figure 3:
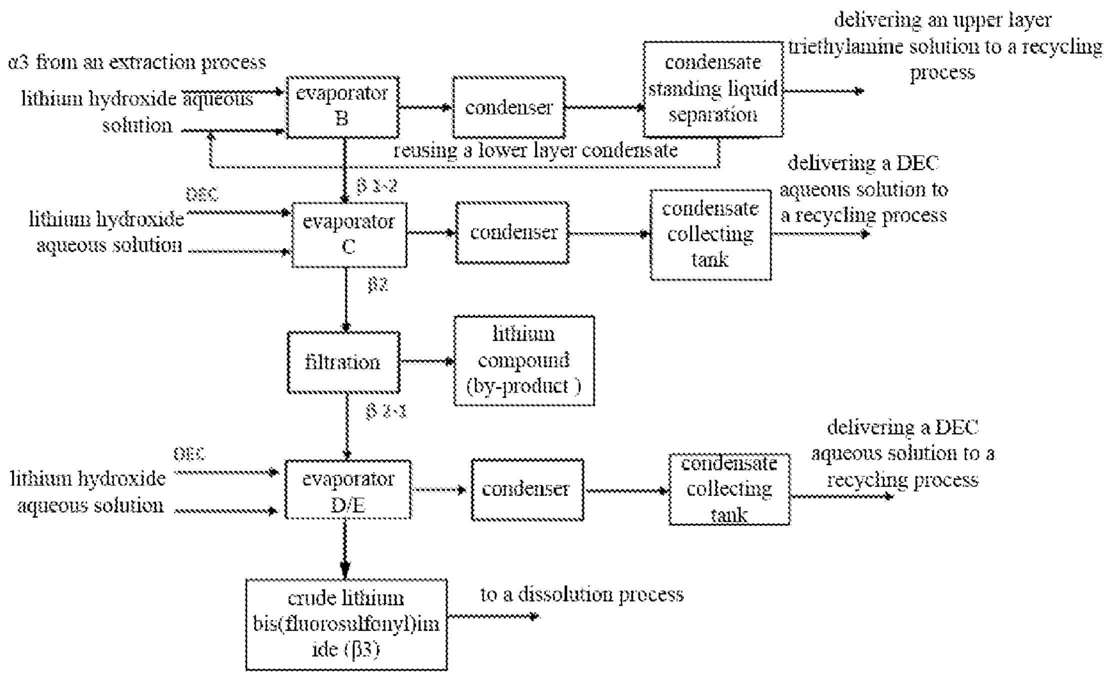
FIG. 3 is a schematic flow chart of a j-stage process (alkalinization→dehydration→desolventization).

[Alkalinization Step→Dehydration Step→Desolventization Step]

β-stage process (alkalinization→dehydration→desolventization) is described with reference to FIG. 3.

The stream α3 was directly alkalinized in a falling film evaporator B (a steam heating temperature of a hot water bucket was 35° C.), and a lithium hydroxide aqueous solution (with a concentration of 5 mol/L, where a volume ratio of the stream α3 to the lithium hydroxide aqueous solution is 1.1:1) was dropped while stirring was performed continuously. After the reaction lasted for 1 hour, a mixture stream β1-1 (a crude lithium salt) was obtained. At the same time, hot water at 35° C. was used to heat the stream β1-1, and vacuum was activated to keep the vacuum degree in the kettle at −0.08 MPa, and steaming time was 6 hours. The front and latter stages of the vacuum pump performed five-stage condensation with water at 25° C. and 0° C. respectively. The condensate was left for standing liquid separation, the upper layer was a triethylamine aqueous solution and pumped to the recycling workshop for recycling, and the lower layer was recovered for the alkalinization process to prepare the lithium hydroxide aqueous solution. After evaporation in the falling film evaporator B, a stream β1-2 containing lithium bis(fluorosulfonyl)imide (containing 85 wt % of the lithium bis(fluorosulfonyl)imide and 10 wt % of the water) was obtained. During the evaporation in the falling film evaporator B, a lithium hydroxide aqueous solution (with a concentration of 5 mol/L) was added to maintain a pH of the stream β1-2 at 8.

The stream β1-2 was continued to be evaporated in a falling film evaporator C (a steam heating temperature of a hot water bucket was 50° C.). At the same time, diethyl carbonate (DEC) was metered and pumped (a flowmeter was controlled so that a volume ratio of DEC to the stream β1-2 was 0.6:1), vacuum (−0.08 MPa) heating and evaporation were continued, and the front and latter stages of the vacuum pump performed five-stage condensation with water at normal temperature (25° C.) and 0° C. respectively, and the condensate was an aqueous solution containing DEC. The condensate was delivered to the recycling workshop for recycling. After evaporation in the falling film evaporator C, a stream β2 containing lithium bis(fluorosulfonyl)imide (containing 70 wt % of the lithium bis(fluorosulfonyl)imide, 29 wt % of diethyl carbonate and 1 wt % of the water) was obtained. During the evaporation in the falling film evaporator C, a lithium hydroxide aqueous solution (with a concentration of 5 mol/L) was metered and added to maintain a pH of the stream β2 at 8.

The stream β2 obtained after being evaporated by the falling film evaporator C was centrifuged and filtered through a disc centrifuge (with a rotation speed of 1500 rpm) to filter out a by-product lithium compound, so as to obtain a stream β2-1 containing 1 wt % of the water, 30 wt % of the diethyl carbonate and 69 wt % of the lithium bis (fluorosulfonyl)imide. The stream β2-1 was then pumped into a scraper evaporator D (a steam heating temperature of a hot water bucket was 75° C.), and at the same time, diethyl carbonate (DEC) was metered and pumped (a flowmeter was controlled so that a volume ratio of DEC to the stream β2-1 was 0.25:1), and vacuum (with a vacuum degree of −0.08 MPa) heating, evaporation and dehydration were continued. A lithium hydroxide solution (with a concentration of 5 mol/L) was also added while evaporation was performed by a scraper evaporator D so that a pH of a stream β3 obtained was maintained at 8. A condensate mainly contained DEC and a small amount of water, and the condensate was delivered to the recycling workshop for recycling. After 6 hours of evaporation, lithium bis(fluorosulfonyl)imide β3 (containing 85 wt % of the lithium bis(fluorosulfonyl)imide and 15 wt % of the diethyl carbonate) with a water content of 3000 ppm was obtained.

[Refinement Step]

Figure 4:
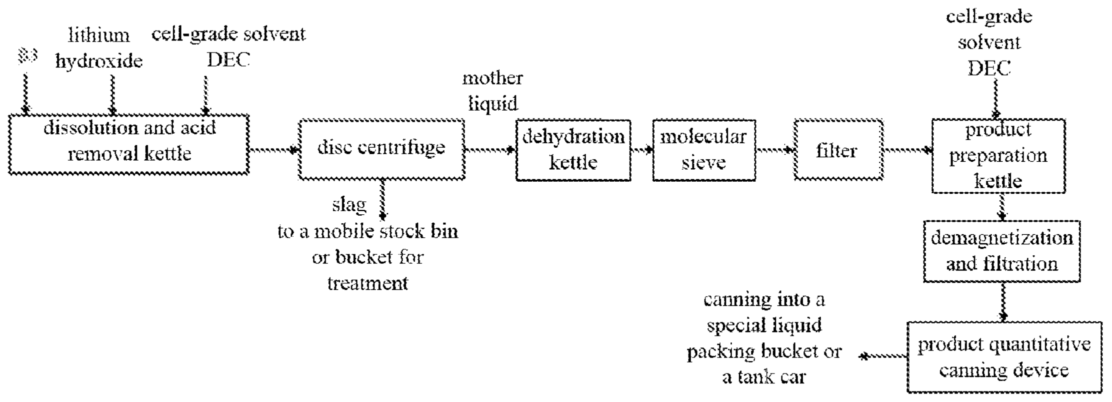
FIG. 4 is a schematic flow chart of a refinement process.

An optional refinement step is described with reference to FIG. 4.

70 L of diethyl carbonate and 0.1 kg of lithium hydroxide were added to 30 kg of the lithium bis(fluorosulfonyl)imide β3. Then a disc centrifuge was used to perform centrifugation (with a rotation speed of 1500 rpm) to remove a solid, then a filtrate g-1 (HF≤50 μg/g) was delivered to a dehydration kettle in which 20 kg of molecular sieves were added, for stirring at a rotation speed of 800 rpm and treatment for 2 h. Then a filter was used to filter out the molecular sieves, and a filtrate g-2 obtained (a water content ≤20 μg/g) was delivered to a product preparation kettle. Finally, demagnetization (a vertical demagnetization filter, 8000 gauss) and filtration (a 1 micron filter, a 0.5 micron filter, and a 0.1 micron filter, respectively) were performed to obtain a diethyl carbonate solution containing lithium bis(fluorosulfonyl)imide with a concentration of 28 wt %, and canning was performed finally.

Upon detection, purity of powder obtained by drying the lithium bis(fluorosulfonyl)imide with a concentration of 28 wt % was 99.4 wt %, and yield reached 95%, where a free acid content was 20 μg/g and a water content was 25 μg/g.

Figure 2:
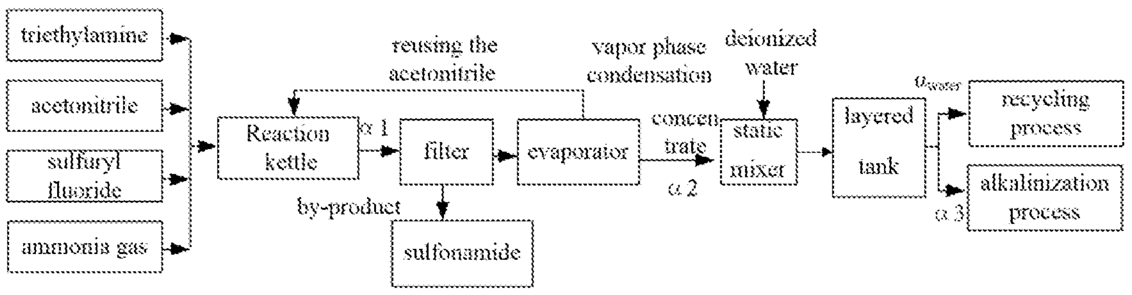
FIG. 2 shows a schematic flow chart of an α-stage process (synthesis→evaporation→extraction), in which a static mixer is used in an extraction process.

Example 2: Technical solution of Example 2 is the same as that of Example 1, and differs in that in an extraction step, a static mixer is adopted in an extraction process (a ratio of length to pipe diameter L/D=10; and a flow is controlled so that a weight ratio of deionized water to α2 is 1:1.2). As shown in FIG. 2, the stream α2 was pumped to a static mixer to be fully mixed with deionized water in the static mixer, and delivered to a layered tank for standing layering for 2 hours, to obtain an aqueous phase $\alpha_{water}$ containing a triethylamine hydrogen fluoride salt as an upper layer liquid and an oil phase α3 containing $(SO_2F—NH—SO_2F)\cdot Et_3N$ as a lower layer liquid, the upper layer aqueous phase was delivered to a recycling workshop for treatment, and the lower layer oil phase was delivered to an alkalinization step. Upon detection, the oil phase α3 contained 1000 ppm of $F^-$.

Upon detection, purity of powder obtained by drying the above lithium bis(fluorosulfonyl)imide β3 was 99.0%, and yield reached 92%, where a free acid content was 25 g/g, and a water content was 30 μg/g.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications made to the embodiments that are easily thought of by persons skilled in the art without departing from the spirit of the present application, and other embodiments that are constructed by combining some of the constituent elements of the embodiments are also included in the scope of the present application.

What is claimed is:

1. A method for preparing lithium bis(fluorosulfonyl) imide, comprising:

a synthesis step, comprising subjecting sulfuryl fluoride, ammonia gas, and triethylamine to reaction in a reaction device in presence of a solvent to obtain a stream α1 containing ($SO_2F$—NH—$SO_2F$)·$Et_3N$, a triethylamine hydrogen fluoride salt, and triethylamine;

an evaporation step, comprising performing evaporation on the stream α1 to obtain a stream α2 containing ($SO_2F$—NH—$SO_2F$)·$Et_3N$ and the triethylamine hydrogen fluoride salt;

an extraction step, comprising washing the stream α2 with water in an extraction tower or a static mixer to obtain an oil phase α3 containing ($SO_2F$—NH—$SO_2F$)·$Et_3N$ and an aqueous phase $\alpha_{water}$ containing the triethylamine hydrogen fluoride salt, and separating out the oil phase α3;

an alkalinization step, comprising delivering the oil phase α3 to an evaporator to be mixed with a lithium hydroxide aqueous solution to obtain a mixture stream β1-1, and then performing reduced-pressure evaporation on the stream β1-1 to obtain a stream β1-2 containing lithium bis(fluorosulfonyl)imide;

a dehydration step, comprising mixing the stream β1-2 containing the lithium bis(fluorosulfonyl)imide with an ester solvent, and then performing evaporation in an evaporator to obtain a stream β2 containing lithium bis(fluorosulfonyl)imide; and a desolventization step, comprising mixing the stream β2 with an ester solvent, and then performing evaporation in an evaporator to obtain lithium bis(fluorosulfonyl) imide β3.

2. The method according to claim 1, wherein in the synthesis step:

a molar ratio of the sulfuryl fluoride:the ammonia gas:the triethylamine is (1.5-3.5):1:(1-6);

the solvent is selected from acetonitrile, propionitrile, isopropionitrile, diethyl ether, propyl ether, isopropyl ether, tetrahydrofuran, acetone, butanone, methyl isobutyl ketone, methyl pyrrolidone, or a mixture of any two or more thereof;

a reaction temperature of the reaction is not higher than 25° C.; and/or a reaction pressure of the reaction is not higher than 0.4 MPa.

3. The method according to claim 1, further comprising, between the synthesis step and the evaporation step (b):

performing filtering on the stream α1 to remove a by-product sulfonamide solid.

4. The method according to claim 1, wherein in the evaporation step, the stream α1 is evaporated by using a falling film evaporator.

5. The method according to claim 1, wherein in the extraction step, the aqueous phase $\alpha_{water}$ containing the triethylamine hydrogen fluoride salt is delivered for recycling treatment, and triethylamine obtained after the aqueous phase $\alpha_{water}$ is subjected to alkalinization and purification treatment is recyclable.

6. The method according to claim 1, wherein in the alkalinization step, the oil phase α3 is mixed and stirred with the lithium hydroxide aqueous solution for reaction for 0.5-3 hours.

7. The method according to claim 1, wherein in the alkalinization step, a condensate obtained by evaporating the stream β1-1 is subjected to standing liquid separation to obtain an upper layer liquid that is a triethylamine aqueous solution and a lower layer liquid that is condensed water, the upper layer liquid is delivered for recycling treatment, and the lower layer liquid is recycled to prepare the lithium hydroxide aqueous solution for the alkalinization step.

8. The method according to claim 1, wherein in the alkalinization step, a volume ratio of the oil phase α3 to the lithium hydroxide aqueous solution is (0.8-5): 1.

9. The method according to claim 1, wherein in the dehydration step and the desolventization step, an aqueous solution of the ester solvent obtained by condensation is delivered for recycling treatment.

10. The method according to claim 1, wherein the stream β2 obtained in the dehydration step contains 0.1 vol % to 2 vol % of the water and 20 vol % to 40 vol % of the ester solvent.

11. The method according to claim 1, wherein the lithium bis(fluorosulfonyl)imide β3 obtained in the desolventization step has a water content of 2000 ppm to 4000 ppm.

12. The method according to claim 1, wherein the evaporation in the evaporation step, the alkalinization step, the dehydration step, and the desolventization step is performed in one or more evaporators.

13. The method according to claim 1, further comprising:

a refinement step, comprising delivering the lithium bis (fluorosulfonyl)imide β3 to a dissolution and acid removal kettle and adding an ester solvent and lithium hydroxide, then performing centrifugation and filtration, delivering a filtrate g-1 obtained to a dehydration kettle containing a molecular sieve to remove water, removing the molecular sieve by filtration, and delivering a filtrate g-2 obtained to a product preparation kettle;

wherein the centrifugation is performed by using a scraper centrifuge or a disc centrifuge.

14. The method according to claim 1, wherein in the dehydration step and the desolventization step, the ester solvent is respectively independently selected from an organic solvent that has a boiling point greater than 70° C. and is insoluble in water.

15. The method according to claim 1, wherein:

a temperature of the evaporation in the alkalinization step is controlled to be 30° C.-40° C.;

and/or a temperature of the evaporation in the dehydration step is controlled to be 40° C.-55° C.;

and/or a temperature of the evaporation in the desolventization step is controlled to be 60° C.-80° C.

16. The method according to claim 1, wherein:

in the alkalinization step, the dehydration step, and the desolventization step, a pH of the mixture is maintained at 7-9 by adding the lithium hydroxide aqueous solution during the evaporation;

in the alkalinization step, the dehydration step, and the desolventization step, a concentration of the lithium hydroxide aqueous solution is 1 mol/L to 15 mol/L;

in the desolventization step, for the lithium bis(fluorosulfonyl)imide β3, HF is ≤50 μg/g and a water content is ≤20 μg/g; and/or in the dehydration step and the desolventization step, the ester solvents used are same.

* * * * *